US012081550B1

(12) United States Patent
Zhang et al.

(10) Patent No.: US 12,081,550 B1
(45) Date of Patent: Sep. 3, 2024

(54) MACHINE LEARNING-BASED URL CATEGORIZATION SYSTEM WITH SELECTION BETWEEN MORE AND LESS SPECIFIC CATEGORY LABELS

(71) Applicant: Netskope, Inc., Santa Clara, CA (US)

(72) Inventors: Xinjun Zhang, San Jose, CA (US); Yi Zhang, Santa Clara, CA (US); Rongrong Tao, Fremont, CA (US); Dong Guo, San Jose, CA (US); Hongbo Yang, Palo Alto, CA (US); Jun Ou, Cupertino, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/375,976

(22) Filed: Oct. 2, 2023

(51) Int. Cl.
*H04L 9/40* (2022.01)
*H04L 41/16* (2022.01)

(52) U.S. Cl.
CPC ............ *H04L 63/101* (2013.01); *H04L 41/16* (2013.01)

(58) Field of Classification Search
CPC ............................... H04L 63/101; H04L 41/16
See application file for complete search history.

(56) References Cited

U.S. PATENT DOCUMENTS 10,593,431 B1 * 3/2020 Neumann ............... G16H 20/00
11,451,532 B2 * 9/2022 Arif Khan ............. G06N 20/10
2020/0051550 A1 * 2/2020 Baker ..................... G06N 3/084
2020/0184254 A1 * 6/2020 Finkelshtein ...... G06F 18/24765
2022/0147815 A1 * 5/2022 Conwell ............. H04L 63/1416
2022/0335311 A1 * 10/2022 Lahlou ................... G06N 3/084

OTHER PUBLICATIONS

Tao Wang, "High Precision Open-World Website Fingerprinting", 2020, 16 pages. (Year: 2020).*
Yasinski et al., How Transferable Are Features in Deep Neural Networks? Advances in Neural Information Processing Systems 27, Dec. 2014, pp. 3320-3328. (https://doi.org/10.48550/arXiv.1411.1792).

(Continued)

*Primary Examiner* — Yonas A Bayou
(74) *Attorney, Agent, or Firm* — Haynes Befel & Wolfeld LLP; Ernest J. Beffel, Jr.

(57) ABSTRACT

Disclosed is technology for choosing between alternative category labels tentatively assigned to tens of thousands of webpages by a classifier ensemble running on processors, applying the classifier ensemble with a sensitive category classifier, a non-sensitive category classifier, a title and metadata classifier and a heuristic classifier to tens of thousands of webpages. Also disclosed is applying a post processor to outputs of the classifier ensemble and tentatively assigning at least two category labels for non-sensitive categories for webpages; two category labels, automatically determining that at least one but not all of the tentatively assigned category labels is a general label and de-assigning the general label; saving the category label that is not de-selected to the webpage; and distributing the assigned category labels for at least some of the tens of thousands of webpages for use in controlling access to webpages by users on user systems protected using the assigned labels.

20 Claims, 13 Drawing Sheets

(56) References Cited

OTHER PUBLICATIONS

Tan B et al, Multi-transfer: Transfer learning with multiple views and multiple sources. Proceedings of the 2013 SIAM International Conference on Data Mining May 2, 2013, pp. 243-251.
Cheng et al., "Cloud Security For Dummies, Netskope Special Edition," John Wiley & Sons, Inc., dated 2015, 53 pages.
"Netskope Introspection," netSkope, Inc., 2015, 3 pgs.
Netskope, "Data Loss Prevention and Monitoring in the Cloud", Nov. 2014, 18 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Repave the Cloud-Data Breach Collision Course," netSkope, Inc., 2014, 6 pgs.
Netskope, "The 5 Steps to Cloud Confidence," netSkope Inc., 2014, 11 pgs.
"Netskope Cloud Confidence Index," netSkope, Inc., 2015, 4 pgs.
New Features And Enhancements In Release 97.0.0, Netskope, Inc., Jul. 8, 2023, 12 pages (download from https://docs.netskope.com/en/netskope-help/netskope-release-notes/netskope-cloud-release-notes/netskope-release-notes-version-97-0-0/new-features-and-enhancements-in-release-97-0-0/).
Cleanlab Studio, Cleanlab Inc. Aug. 23, 2023, 12 pages (downloaded from https://cleanlab.ai/).
Pillai et al., "Hybrid unsupervised we-attack detection and classification—A deep learning approach", Computer Standards & Interfaces, vol. 86, No. 103738, 2022, 11 pgs.
Douzi et al., "Advanced Phishing Filter Using Autoencoder and Denoising Autoencoder", BDIOT '17: Proceedings of the International Conference on Big Data and Internet of Things, 2017, pp. 125-129.

\* cited by examiner

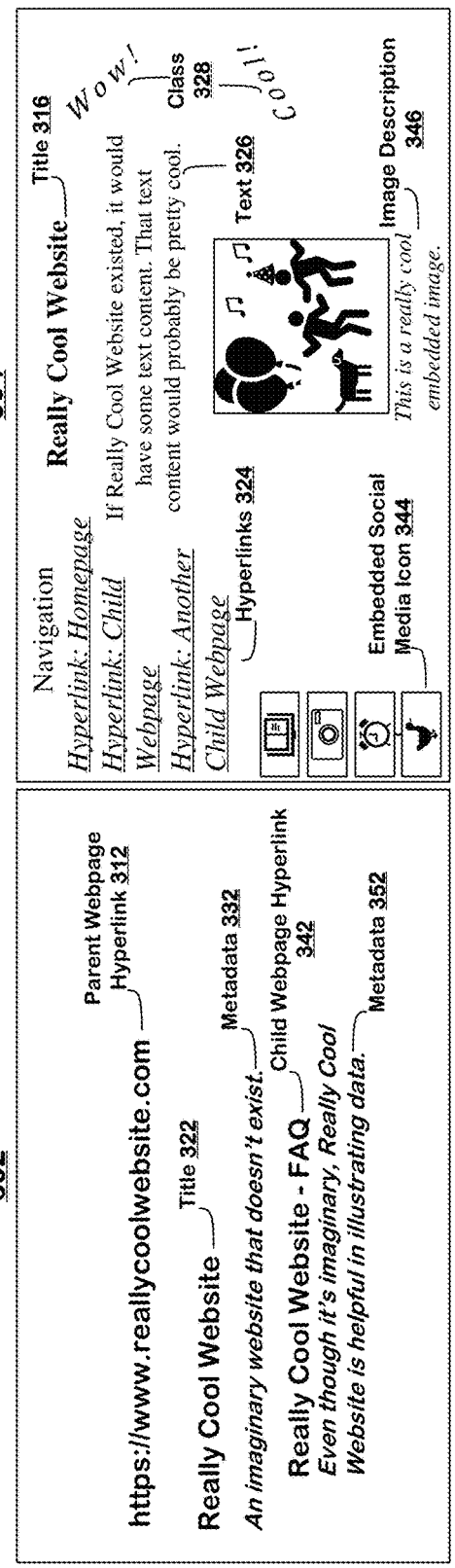
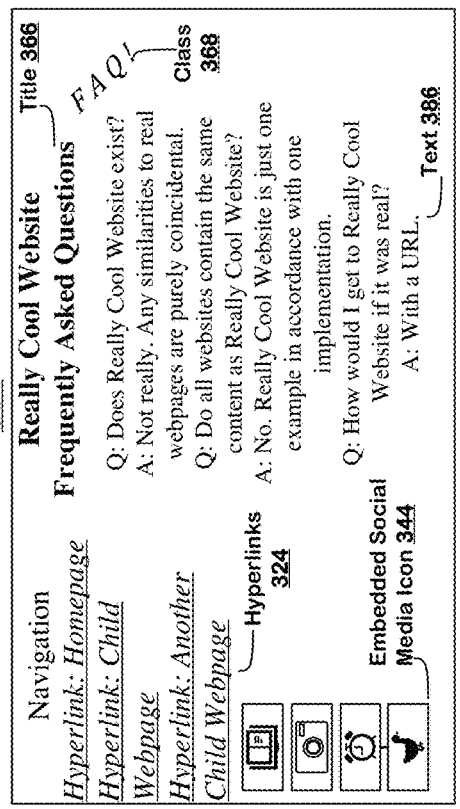
FIG. 3

Training Observations 700

| Sensitive Categories | # Observations |
|---|---|
| Adult Content | 1260 |
| Gambling | 1207 |
| Dating | 1183 |
| Marijuana | 895 |
| Weapons | 1305 |
| Abortion | 1050 |
| Alcohol | 992 |
| Tobacco | 840 |
| Web Proxies/Anonymizers | 771 |
| Parked Domains | 1476 |
| Pay to Surf | 667 |
| Piracy & Copyright Theft | 918 |
| Chat, IM, Other Communication | 938 |
| Cloud Storage | 846 |
| Peer-to-Peer (P2P) | 855 |
| Criminal Activities | 1301 |

| Non-Sensitive Categories | # Observations |
|---|---|
| Automotive | 20892 |
| Education | 38486 |
| Entertainment | 42396 |
| Fashion | 31016 |
| Finance/Accounting | 14230 |
| Games | 7885 |
| Government/Legal | 19760 |
| Health/Nutrition | 71888 |
| Home/Garden | 17333 |
| Job Search/Careers | 4867 |
| Real Estate | 30701 |
| Religion | 16763 |
| Social | 1699 |
| Sports | 19732 |
| Technology | 30047 |
| Trading/Investing | 2229 |

FIG. 7

Post-Processing Pseudocode 800A

```
#case: Non-200 Unreachable overwrites everything
    if 'Unreachable' in labels:
        label_combined = 'Unreachable'
#case: sensitive + general non-sensitive
    general non-sensitive set = ['Personal Sites & Blogs', 'Shopping', 'Technology', 'Social']

if (there is a sensitive category label and non-sensitive category label):
        If (non-sensitive category label is in general non-sensitive set ):
            Keep both sensitive and non-sensitive category label
        Else:
            Remove non-sensitive category label
#case: sensitive + non-sensitive
    if ('Marijuana' in labels and ('Finance/Accounting' or 'Government & Legal' or 'Education' or 'Job Search/Careers') in labels):
        Remove 'Marijuana'
    if ('Weapons' in labels and ('Government & Legal' or 'Insurance' or 'Advocacy Groups & Trade Associations' or 'Health & Nutrition' or 'Habits & Interests') in labels):
        Remove 'Weapons'
    if ('Alcohol' in labels and 'Food & Drink' in labels):
        Remove 'Alcohol'
```

FIG. 8A

Post-Processing Pseudocode 800B case: multiple non-sensitive
1. remove Business if there are more specific category
spec = ['Home & Garden', 'Real Estate', 'Government & Legal', 'Entertainment', 'Automotive', 'Finance/Accounting', 'Religion', 'Trading & Investing', 'Games', 'Shopping', 'Health & Nutrition', 'News & Media', 'Social', 'Fashion', 'Sports', 'Government & Legal', 'Education', 'Insurance', 'Job Search & Careers', 'Travel', 'Food & Drink', 'Web Hosting, ISP & Telco', 'Marketing', 'Philanthropic Organizations', 'Social & Affiliation Organizations', 'Logistics', 'Security', 'Utilities', 'Business Intelligence and Data Analytics', 'Financial Aid & Scholarships', 'HR', 'IaaS/PaaS', 'Military', 'Nursing', 'Professional Networking', 'Search Engines', 'Shareware/Freeware', 'Streaming & Downloadable Audio', 'Streaming & Downloadable Video', 'Survey Solutions', 'Telecom and Call Center', 'Translation', 'Webmail']
If (there is any label in spec list):
    Remove "Business"
Else:
    Keep "Business"
2. remove Shopping if there are more specific category per definition
spec = ['Home & Garden', 'Automotive', 'Web Design', 'Marketing', 'Business Intelligence and Data Analytics', 'HR', 'IaaS/PaaS', 'Nursing', 'Professional Networking', 'Search Engines', 'Survey Solutions', 'Translation', 'Webmail']
If (there is any label in spec list):
    Remove "Shopping"
Else:
    Keep "Shopping"
3. remove Technology if there are more specific category per definition
spec = ['Fashion', 'Trading & Investing', 'Religion', 'Game', 'Job Search & Careers', 'Web Hosting, ISP & Telco', 'Logistics', 'Security', 'Utilities', 'Web Design', 'Marketing', 'Financial Aid & Scholarships', 'HR', 'Professional Networking', 'Search Engines', 'Shareware/Freeware', 'Survey Solutions', 'Telecom and Call Center', 'Webmail']
If (there is any label in spec list):
    Remove "Technology"
Else:
    Keep "Technology"
4. remove Personal Sites & Blogs if there are more specific category per definition
spec = ['News & Media', 'Government & Legal', 'Finance/Accounting', 'Insurance', 'Marketing', 'Financial News', 'Social & Affiliation Organizations', 'Security', 'Advocacy Groups & Trade Associations', 'Logistics', 'Financial Aid & Scholarships', 'HR', 'IaaS/ PaaS', 'Nursing', 'Professional Networking', 'Search Engines', 'Survey Solutions', 'Telecom and Call Center', 'Webmail']
If (there is any label in spec list):
    Remove "Personal Sites & Blogs"
Else:
    Keep "Personal Sites & Blogs"

case: standard categories VS. special categories
special categories = ['Unreachable', 'No Content', 'Redirect', 'Login Screens']
1. Remove special categories when there is standard categories
2. Keep only one special category in the preferred order as: Login Screens, Redirect, No Content

FIG. 8B

Accuracy Scores 900

| Category | Accuracy Score | Category | Accuracy Score | Category | Accuracy Score |
|---|---|---|---|---|---|
| No Content | 90.61% | Real Estate | 78.98% | Games | 77.89% |
| Parked Domains | 94.18% | Sports | 84.36% | Security | 77.01% |
| Shopping | 67.24% | Web Hosting/ISP/Telco | 65.17% | Philanthropic Orgs | 80.03% |
| Business | 90.54% | Automotive | 93.55% | Trading/Investing | 67.58% |
| Redirect | 90.00% | Government/Legal | 81.38% | Search Engines | 83.42% |
| Adult Content | 98.92% | Web Design | 73.29% | Social | 71.71% |
| Health/Nutrition | 88.83% | Finance/Accounting | 91.39% | Lifestyle | 77.64% |
| Entertainment | 91.42% | Pets | 87.01% | Logistics | 65.48% |
| Technology | 84.28% | News/Media | 66.17% | Kids | 65.57% |
| Fashion | 92.97% | Advocacy/Trade | 50.56% | Hobbies/Interests | 59.36% |
| Personal Sites/Blogs | 76.70% | Social/Affiliation Organizations | 53.75% | Photo Sharing | 72.98% |
| Education | 71.35% | Science | 62.36% | Arts | 70.16% |
| Travel | 94.16% | Job Search/Careers | 81.79% | Webmail | 54.86% |
| Food/Drink | 88.11% | Religion | 78.44% | Alcohol | 81.65% |
| Marketing | 80.41% | Home/Garden | 79.55% | Dating | 94.05% |
| Gambling | 90.36% | Insurance | 64.50% | Streaming/Download Video | 45.87% |
| | | | | Marijuana | 79.42% |
| | | | | Shareware/Freeware | 60.00% |
| | | | | Weapons | 92.77% |
| | | | | Tobacco | 94.38% |
| | | | | Forums | 72.47% |
| | | | | Translation | 72.68% |
| | | | | Streaming/Download Audio | 83.58% |
| | | | | Web Proxies/Anonymizers | 90.02% |
| | | | | Telecom/Call Center | 60.00% |
| | | | | Piracy/Copyright Theft | 93.71% |
| | | | | Nursing | 74.16% |

FIG. 9

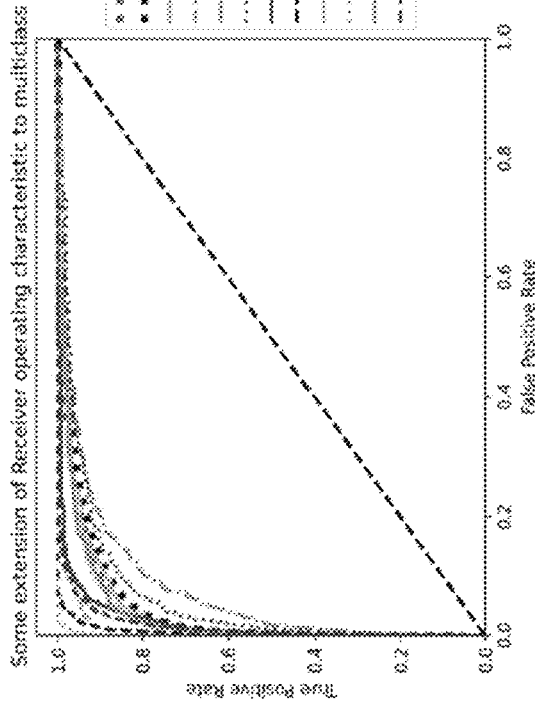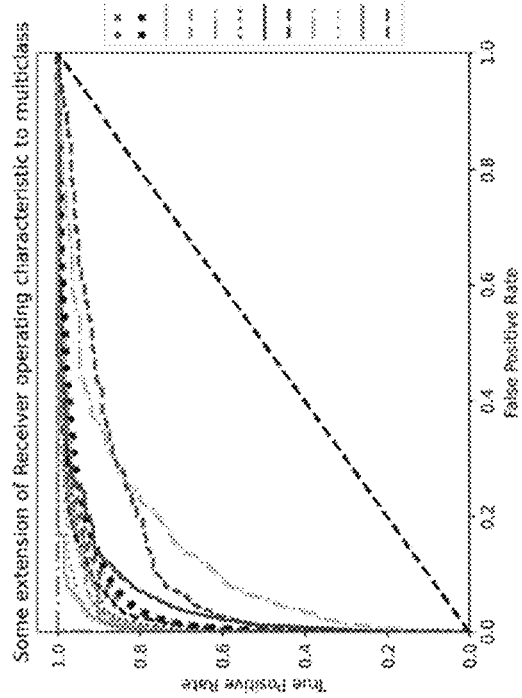
FIG. 10A

MACHINE LEARNING-BASED URL CATEGORIZATION SYSTEM WITH SELECTION BETWEEN MORE AND LESS SPECIFIC CATEGORY LABELS

RELATED CASES

This application is related to the following contemporaneously filed applications which are incorporated by reference for all purposes as if fully set forth herein:

U.S. patent application Ser. No. 18/375,973 titled "Machine Learning-Based URL Categorization System With Noise Elimination," filed 2 Oct. 2023;

U.S. patent application Ser. No. 18/375,975 titled "Machine Learning-Based URL Categorization System With Selection Between Sensitive and Non-Sensitive Category Labels," filed 2 Oct. 2023; and

INCORPORATIONS

The following materials are incorporated by reference for all purposes as if fully set forth herein:

U.S. application Ser. No. 17/475,236, titled "A Machine Learning-Based system for Detecting Phishing Websites Using the URLs, Word encodings and Images of Content Pages," filed 14 Sep. 2021, now U.S. Pat. No. 11,444,97, issued 13 Sep. 2022;

U.S. application Ser. No. 17/475,233, titled "Detecting Phishing Websites Via a Machine Learning-Based System Using URL Feature Hashes, HTML Encodings and Embedded Images of Content Pages," filed 14 Sep. 2021, now U.S. Pat. No. 11,336,689, issued 17 May 2022; and U.S. application Ser. No. 17/475,230, "Machine Learning-Based Systems and Methods of Using URLs And HTML Encodings for Detecting Phishing Websites," filed 14 Sep. 2021 now U.S. Pat. No. 11,438,377 issued 6 Sep. 2022.

FIELD OF THE TECHNOLOGY DISCLOSED

The technology disclosed relates generally to policy enforcement for web security, and in particular relates to providing a machine-learning based uniform resource locator (URL) categorization classifier trained to classify websites into one or more categories according to a web category taxonomy.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. Research suggests that eighty percent of enterprise workloads will be in the cloud by 2025. According to International Data Corporation, "spending on public cloud information technology (IT) infrastructure surpassed spending on traditional IT infrastructure for the first time in the second quarter of 2020." For example, enterprise companies often utilize software as a service (Saas) solutions instead of installing servers within the corporate network to deliver services.

Data is the lifeblood of many businesses and must be effectively managed and protected. With the increased adoption of cloud services, companies of all sizes are relying on the cloud to create, edit and store data. This presents new challenges as users access cloud services from multiple devices and share data, including with people outside of an organization. It is easy for data to get out of an organization's control.

Enterprises are faced with the daunting challenge of seamlessly securing critical data traversing the network to access SaaS apps, IaaS, and the web from any endpoint as customers want to be able to securely send all of their data between customer branches and data centers. *All* data includes peer-to-peer file sharing (P2P) via protocols for portal traffic such as BitTorrent (BT), user datagram protocol (UDP) streaming and file transfer protocol (FTP); voice, video and messaging multimedia communication sessions such as instant message over Internet Protocol (IP) and mobile phone calling over LTE (VOLTE) via the Session Initiation Protocol (SIP) and Skype; Internet traffic, cloud application data, and generic routing encapsulation (GRE) data. As an example of the size of the P2P file sharing segment of data that needs to be handled securely, BitTorrent, one common protocol for transferring large files such as digital video files containing TV shows or video clips or digital audio files containing songs, had 15-27 million concurrent users at any time and was utilized by 150 million active users as of 2013. Based on these figures, the total number of monthly BitTorrent users was estimated at more than a quarter of a billion, with BitTorrent responsible for 3.35% of worldwide bandwidth, more than half of the 6% of total bandwidth dedicated to file sharing.

As the number of data sources increases, there are hundreds of ways data can be compromised. Employees might send a wrong file, not be careful when rushing to a deadline, or share data and collaborate with people outside of their organization. Native cloud storage sync clients also pose a significant risk to organizations. A continuous sync takes place between the end point and the cloud service without employees realizing they may be leaking confidential company information. In one use case that exemplifies the need for unified policy enforcement functions, companies may want to allow employees and contractors to make voice calls and participate in video conferences, while not enabling them to transfer files over LTE via SIP and Skype. In another example, an enterprise may want to enable their users to view videos and not be able to upload or download video content files.

Accordingly, it is vital to facilitate the use of cloud services so people can continue to be productive and use the best tools for the job without compromising sensitive information such as intellectual property, non-public financials, strategic plans, customer lists, personally identifiable information belonging to customers or employees, and the like.

An opportunity arises to augment a cloud-based policy enforcement system that unifies functions of packet-based and protocol-based access control and traffic inspection, threat detection and activity contextualization and inspection on inspectable and non-inspectable traffic with a machine-learning based URL categorization system configured to categorize websites into one or more categories.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3 illustrates examples of the types of data that can be extracted for a particular website.

FIG. 7 is a table with example training data volume across different website categories.

FIG. 8A shows example pseudocode for operations performed by a post-processing engine.

FIG. 8B continues the example pseudocode for operations performed by a post-processing engine.

FIG. 9 is a table containing accuracy scores obtained from one implementation of the disclosed URL categorization classifier for a number of website categories.

FIG. 10A shows two receiver operating characteristic graphs obtained from one implementation of the disclosed URL categorization classifier for a number of website categories.

DETAILED DESCRIPTION

Figure 1:
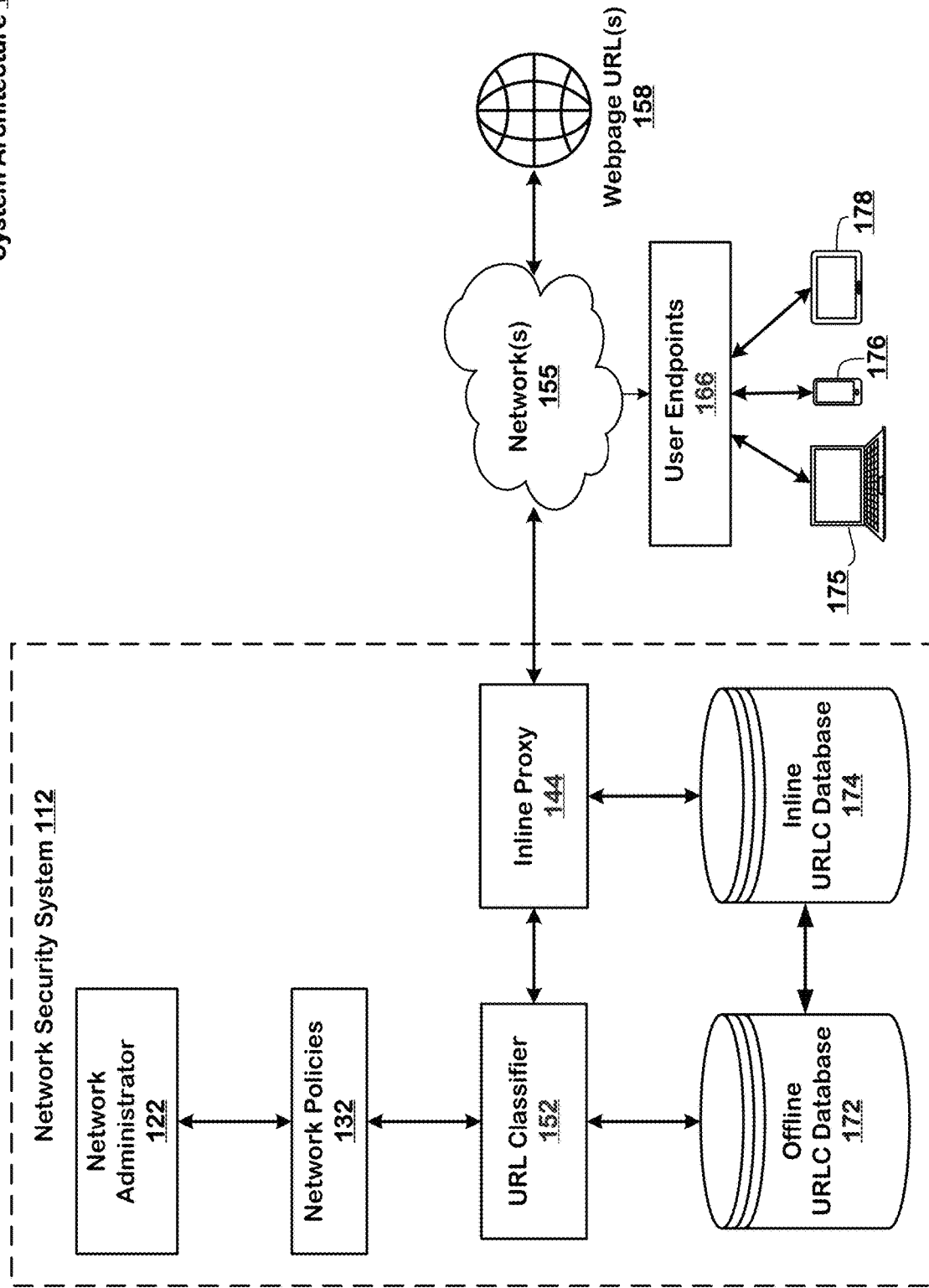
FIG. 1 shows an architectural level schematic of a system for URL categorization to be leveraged in the enforcement of network security policies, in accordance with one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Existing approaches for applying policy enforcement services to customer traffic include a security device point of presence (POP) in the path of data flow between customer branches of organization networks and data centers accessed in the cloud via the Internet.

Each application also has unique requirements around network performance that must be considered. For example, webinar (one-to-many) streaming needs high bandwidth, real-time collaboration needs low latency, and backend systems hosted in virtual private clouds may have very high resilience and redundancy requirements. Further complicating matters, unlike private applications, cloud applications do not have a predictable set of IP addresses and ports, and are constantly changing and evolving, making them a nebulous and ever-changing target.

Customers want to know how to support and secure their complex mix of applications, managed (IT-led), unmanaged (Shadow IT), on-prem, private apps in the cloud, third-party SaaS and more. Organizations want to utilize a single policy enforcement service that can apply policy enforcement services to all customer traffic, expanding beyond cloud apps and web traffic firewalls to securely process P2P traffic over BT, FTP and UDP-based streaming protocols as well as Skype, voice, video and messaging multimedia communication sessions over SIP, and web traffic over other protocols.

Although web security vendors have attempted to address this problem by packaging and moving their legacy solutions to the cloud, this approach does not address policy enforcement challenges created by the use of SaaS and IaaS, or the way the dynamic web is built today. To realize this new network vision, a fundamentally different approach to policy enforcement is needed—one that allows organizations to address these changes head-on with a unified cloud and web policy enforcement platform that was designed from the start for today's next-generation cloud-first enterprise.

In one example, the policy enforcement service needs to allow employees and contractors at an organization to make calls, but not transfer files, a policy that the service can enforce by encoding a SIP control channel and data channel. The enforcement of this policy necessitates more than a SIP proxy to enable the ability to anticipate where the data is getting transferred, and the ability to either avoid or block that channel, based on information in the channel. A streaming agent sending traffic looks at the port only, so needs to know all available ports before sending. If handling all protocols, the policy enforcement service can catch web traffic over non-standard ports, but it is hard to gather the traffic. An existing workaround for securing files from being transferred is to block access to ports, but policy enforcement services want to load everything, safely—not block ports. P2P data packets try standard ports first, and then often fall back, hopping from port to port, which also limits the usefulness of blocking a port, because the P2P data service can hop to a different port.

Security administrators can install policy enforcement service devices in each of the customer branches of organization networks, in data centers and headquarters, to create a management network for applying enforcement policies, so that all traffic goes through security devices. On premise policy enforcement administrators would then be responsible for managing deployment to ensure high availability of devices with failover management, managing software life cycles with patches, and administering upgrades to respond to hardware life cycles. Issues for this hands-on approach to policy enforcement include scaling when company size changes and load balancing for ensuring adequate service availability as data loads vary.

The disclosed technology offers unified policy management in the cloud, as well as dynamic distribution of unified policies in a cloud-based policy enforcement system. with a policy manager that unifies functions of packet-based and protocol-based access control and traffic inspection, threat detection and activity contextualization on inspectable and non-inspectable traffic. The disclosed policy enforcement services platform scales horizontally and uniformly to administer customized security services and policies for organizations and avoid single points of failure.

The technology also discloses a machine learning-based URL categorization classifier trained to classify websites into one or multiple categories, including security risk categories, sensitive categories, and non-sensitive categories. Accurate classification enables customers to enforce their web security policy and perform effective web traffic filtering of sensitive or harmful information. URL classification is a challenging task due to the large data volume, dynamic nature of websites, limited content for analysis, and disparity between categories. Billions of domains and webpages exist on the Internet and continue to grow on a daily basis; hence, even a very small false discovery rate can lead to a massive number of incorrectly classified websites. Website content and domain status change often. For example, a major news network webpage will change content every hour. Websites may have minimal or ambiguous content that is difficult to classify.

Furthermore, website categories broadly vary in specificity (e.g., broad categories like "technology" and "lifestyle" versus narrow categories like "webmail" and "health and wellness") and quantity (e.g., class imbalance resulting from categories with a large volume of easily accessible training data, such as entertainment, versus categories with a smaller volume of easily accessible training data, such as trading/investing). Different categories also may be associated with differing severity of consequence when misclassified. In professional settings, an organization may be more concerned with misclassification of websites containing adult content than misclassification of websites containing gardening content.

For an organization to benefit from web security policies that prevent users from accessing websites that present security risks, affect user productivity, or introduce sensitive content that negatively affects the culture and safety of the organization's environment, a URL categorization classifier that is accurate when generalized across a broad range of categories is advantageous. In addition to the difficulties discussed above with training a classifier using webpage data, it is also challenging to leverage URL categorization mapping (i.e., websites and their corresponding categories) in a production environment due to limited storage and memory resources.

The technology disclosed provides a solution to the training of a URL categorization classifier and the implementation of a trained URL categorization classifier within a production environment. One aspect of the technology disclosed relates to a novel approach for training the classifier with a multi-step process to eliminate noise in the training data, thereby reducing mislabeled data and improving model accuracy. Another aspect of the technology disclosed relates to a set of post-processing rules designed to fine-tune classification results prior to generating a "final verdict" of categories for the website, further reducing the likelihood of a website being incorrectly flagged, or not receiving a flag when one is warranted, within the production environment. Yet another aspect of the technology disclosed relates to the implementation of a offline URL classification mapping database containing hundreds of millions of websites and their corresponding categories and another separate inline URL classification mapping database that only contains a subset of websites that have been selected with the goal of maximizing the match rate, or hit rate, of the inline URL classification mapping database in dependence upon the specific needs of a customer based on their users' online activity and the customer's security policy.

Acronyms

Acronyms used in this disclosure are identified the first time that they are used. These acronyms are terms of art, often used in standards documents. Except where the terms are used in a clear and distinctly different sense than they are used in the art, we adopt the meanings found in security system environments. For the reader's convenience, many of them are listed here:

| | |
|---|---|
| AV | Anti-Virus |
| AWS | Amazon Web Services Cloud Platform |
| BT | BitTorrent communication protocol for P2P file sharing |
| CASB | Cloud Access Security Broker |
| CIDL | Connected Intelligence Data Lake |
| CIDR | Classless Inter-Domain Routing |
| CSPM | Certified Security Project Management |
| CWPP | Cloud Workload Protection Program |
| DHCP | Dynamic Host Configuration Protocol |
| DLP | Data Loss Prevention |
| DPI | Deep Pocket Inspection |
| ECG | Elastic Cloud Gateway |
| FTP | File Transfer Protocol |
| GCP | Google Cloud Platform |
| GDPR | General Data Protection Regulation (EU) |
| GRE | Generic Routing Encapsulation |
| HTTP | Hypertext Transfer Protocol |
| HTTPS | Hypertext Transfer Protocol Secure |
| ICMP | Internet Control Message Protocol |
| IdP | Identity Provider |
| IDP | Intrusion Detection Program |
| IKE | Internet Key Exchange-protocol used to set up a security association (SA) in the IPsec protocol suite |
| IMAP | Internet Message Access Protocol used to retrieve mail at the receiver's side |
| IOC | Indicator of compromise |
| IPS | Intrusion Prevention System |
| IPsec | Internet Protocol Security |
| JSON | JavaScript Object Notation |
| MTU | Maximum Transmission Unit |
| NAT | Network Address Translation |
| N-CASB | Netskope Cloud Access Security Broker |
| NG-SWG | Next Generation-Secure Web Gateway |
| PII | Personally Identifiable Information |
| POP | Point of Presence |
| P2P | Peer to Peer |
| RBAC | Role-Based Administration Controls |
| SaaS | Software as a Service |
| SASE | Secure Access Service Edge |
| SD-WAN | Software-Defined Wide Area Network |
| SDP | Software-Defined Perimeter |
| SIEM | Security Information and Event Management |
| SIP | Session Initiation Protocol |
| SMTP | Simple Mail Transfer Protocol |
| SSL | Secure Socket Layer |
| SWG | Secure Web Gateway |
| TCP | Transmission Control Protocol |
| TSS | Threat Scanning Service |
| UDP | User Datagram Protocol |
| UTM | Unified Threat Management |
| ZTNA | Zero Trust Secure Network Access |

Security services customers using the disclosed technology are able to specify which policy enforcement services apply for different types of tenant data, and to customize security policies for the data being transmitted via the devices of their organizations. In the context of this application, policy enforcement and security are used interchangeably in most contexts. An example system for managing a cloud-based policy enforcement system that unifies functions of packet-based and protocol-based access control and traffic inspection, threat detection and activity contextualization on inspectable and non-inspectable traffic is described next.

Architecture

FIG. 1 shows an architectural level schematic of a system 100 for URL categorization to be leveraged in the enforcement of network security policies. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes system 100 including the endpoints 166. User endpoints 166 may include devices such as computers 175, smart phones 176, and computer tablets 178, which provide access and interact with one or more webpage URL(s) 158 through the network(s) 155. An inline proxy 144 may be interposed between the user endpoints 166 and webpage URL(s) 158 through the network 155 and particularly through a network security system 112 including a network administrator 122, network policies 132, a URL classifier 152, an offline URL categorization (URLC) database 172, and an inline (URLC) database 174, which will be described in more detail. The in-line proxy 144 is accessible through network 155, as part of the network security system 112. The in-line proxy 144 provides traffic monitoring and control between the user endpoints 166 and webpage URL(s) 158. In certain implementations, the in-line proxy 144 has active scanners (not shown), which collect data and snapshots of web pages to be used for the training of the URL classifier 152. The URL classifier 152 is a machine learning-based model that is described in detail below. In other implementations, features can be extracted in real time from the traffic and snapshots are not collected from the live traffic, active scanners are not needed for crawling the web page content at the URLs. The webpage data can also be leveraged to train other machine learning-based models for detecting phishing websites, as described in U.S. application Ser. No. 17/475,233, titled "Detecting Phishing Websites Via a Machine Learning-Based System Using URL Feature Hashes, HTML Encodings and Embedded Images of Content Pages," filed 14 Sep. 2021, now U.S. Pat. No. 11,336,689, issued 17 May 2022, which is incorporated by reference for all purposes.

The in-line proxy 144 monitors the network traffic between user endpoints 166 and URL classifier 152, particularly to enforce network security policies 132 including internet access policies and protocols. Offline URLC database 172 and inline URLC database 174 both contain a number of categorized URLs paired with their respective category/categories. In some implementations of the technology disclosed, there may only be one single URLC database rather than two; in many implementations, it is advantageous to maintain an inline URLC database 174 that is separate from offline URLC database 172. Hundreds of millions of categorized URLs may be entered within the offline URLC database 172 in many implementations. Within some production environments, it is not feasible to load that magnitude of entries to be available for website category lookup in real time (i.e., responsive to a user's network activity) by the in-line proxy 144 due to limited storage space and/or memory resources. Accordingly, inline URLC database 174 is distinct from offline URLC database 172 to allow for the selection of a subset of entries from offline URLC database 172 to be accessible by the in-line proxy 144. This enables an enterprise to control the number of entries accessible by the in-line proxy 144 to be suitable for their storage space and memory resources. In one implementation, the selection of URL entries to be loaded into the inline URLC database 174 is driven by the network policies 132 of network security system 112 (i.e., the inline URLC database 174 is refined in response to the allowable or unallowable website categories, as defined by the network policies 132). For example, if one or more of the network policies 132 dictate that URLs classified as belonging to one category are allowable, but URLs classified as belonging to another category are unallowable, the inline URLC database 174 may contain more URLs from the unallowable category than the allowable category to increase the probability of an unallowed website being matched during website category lookup and thus better enforce the relevant policy. Hence, the goal is to maximize the match rate (or hit rate) of the inline URLC database 174 within the production storage and memory limits. In another implementation, the selection of URL entries to be loaded into the inline URLC database 174 is driven by the most frequently visited websites by user endpoints 166, as determined by analytics obtained by the network security provider, the customer of the network security provider, and/or traffic ranking services for top public websites. In yet another implementation, the selection of URL entries to be loaded into the inline URLC database 174 is driven by trend data relating to URLs or web domains that customers of the network security provider have previously requested to be included. Many implementations use some combination of the above-mentioned criteria that can be used to determine the selected websites.

Continuing with the description of FIG. 1, webpage URL(s) 158 may include individual webpages and/or multiple webpages from a single website/domain aggregated into a single fully qualified domain name (FQDN). Network security system 112 connects to user endpoints 166 and webpage URL(s) 158 via public network 155. Offline URLC database 172 and inline URLC database 174 respectively store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by webpage URL(s) 158. Non-structured data, such as free text, can also be provided by, and targeted back to webpage URL(s) 158. Both structured and non-structured data are capable of being stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store like Apache Cassandra™, Google's Bigtable™, HBase™, Voldemort™, CouchDB™, MongoDB™ Redis™, Riak™, Neo4j™, etc., which stores the parsed JSON objects using key spaces that are equivalent to a database in SQL. Each key space is divided into column families that are similar to tables and comprise of rows and sets of columns.

In the interconnection of the elements of system 100, network 155 couples computers, tablets and mobile devices, cloud-based hosting service, web email services, video, messaging and voice call services, streaming services, file transfer services, webpage URL(s) 158 and network security system 112 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 112 includes both offline URLC database 172 and inline URLC database 174, which can each include one or more computers and computer systems coupled in communication with one another. They can also be one or more virtual computing and/or storage resources. For example, network security system 112 can be one or more Amazon EC2 instances and a URLC database can be Amazon S3™ storage. Other computing-as-service platforms such as Rackspace, Heroku or Force.com from Salesforce could be used rather than implementing network security system 112 on direct physical computers or traditional virtual machines. Additionally, one or more engines can be used and one or more points of presence (POPs) can be established to implement the security functions. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Next, the architecture of the URLC classifier 152 is described in further detail.

Figure 2:
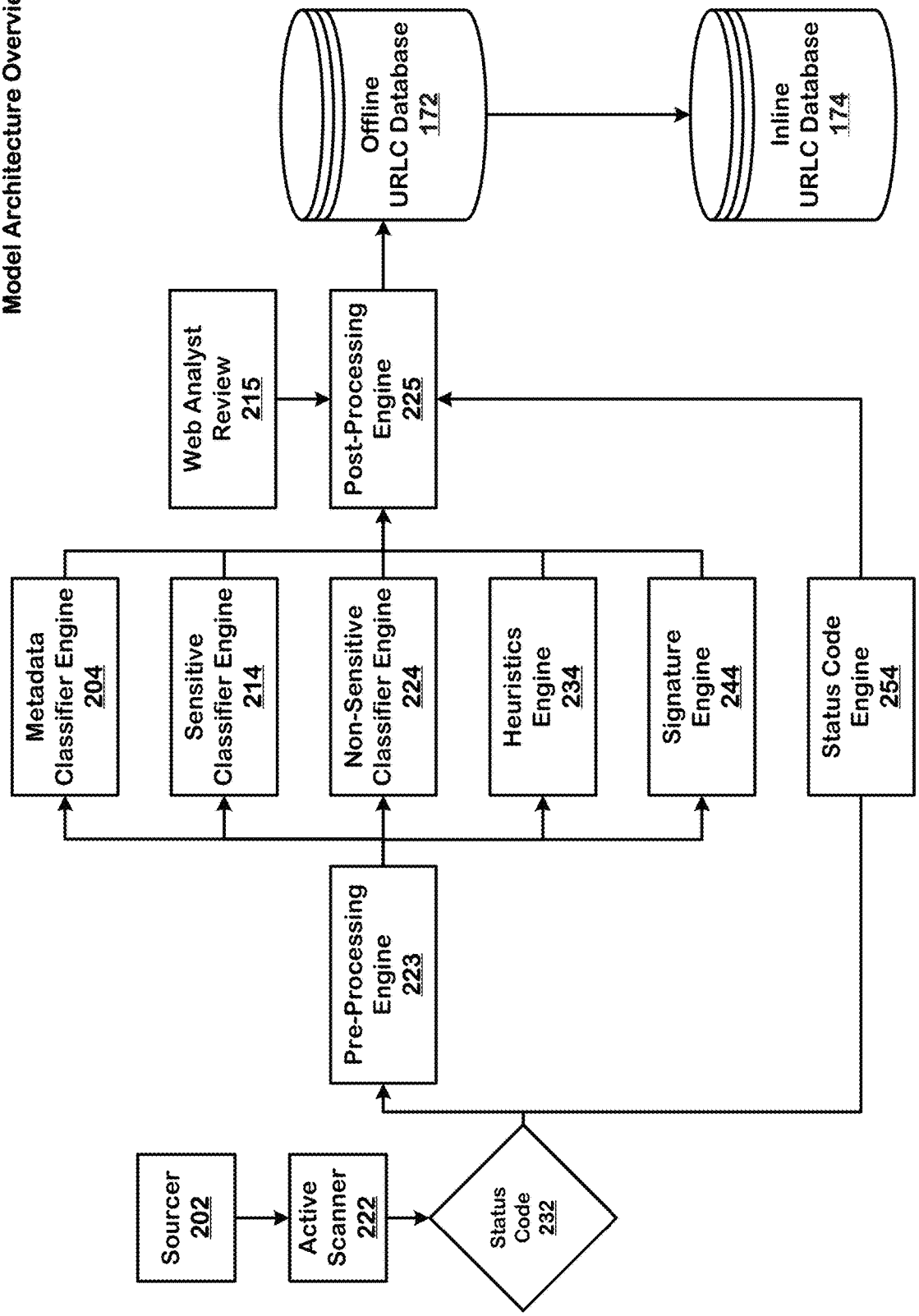
FIG. 2 shows a block diagram for an example URL categorization classifier.

FIG. 2 shows a block diagram 200 for an example URL categorization classifier. The model illustrated within diagram 200 is an ensemble of a plurality of engines, some of which are machine learning-based classifier engines, configured to process feature data extracted from a URL as input and generate, as output, one or more categories for the URL. The various website categories that may be possible outputs of the URL classifier 152 are described later. URLs can be acquired for classification from a sourcer 202 that accumulates both unique domain names and URLs from different sources, including open-source repositories (e.g., Common Crawl, Alexa IM, Open Rank, etc.), domain name registry services, network security system 112 production environments, prior customer escalations, and other public data sources. In one implementation of the technology disclosed, over 334 million unique domain names have been acquired using the sourcer 202. To streamline the process of categorizing websites, the umbrella domain under which a large number of webpages with individual URLs belong can be classified as one observation. For example, a website such as Amazon Marketplace™ contains an infinitely large number of unique URLs relating to different categories, products, user account details, and so on. It is redundant to classify each of the webpages within the Amazon™ domain name; hence, the classification is done once for the FQDN.

Once web domains have been acquired, data can be extracted from the webpage URLs using a headless browser, such as Netskope's ActiveScanner 222 in the example implementation shown within diagram 200. ActiveScanner 222 can be used to crawl the website content and store the HTML content, status code, and/or any error messages within a database and the data can later be used to determine the categories of the websites. In one implementation of the technology disclosed, ActiveScanner 222 has a crawling capacity of approximately 8 million websites per day with the compressed HTML page size measuring up to 800 kB. Once this data has been obtained for a particular website, an operation 232 evaluates the status code of the website. If the status code is invalid, the website data is passed to a status code engine 254. Status code engine 254 checks the status code value and error messages and assigns the website to either a "Redirect" or "Unreachable" category, accordingly. Once the webpage receives one of the two potential invalid status code categories, the data is processed by post-processing engine 225, discussed further below.

If a website is determined to have a valid status code, the HTML data for the website is then parsed by pre-processing engine 223 to extract relevant information and store said information in a structured format (i.e., as described above with reference to system 100) within a database. Various content information is extracted from the HTML content, such as the title of the website, the metadata available from the HTML source code, text content displayed on the webpage, image titles, video titles, hyperlinks directing to other webpages, and/or any CSS elements. HTML content data is the focus of FIG. 3. In some implementations, the pre-processing engine 223 performs additional operations such as checking the language of the website and removing non-essential content such as emoji symbols.

Following pre-processing of the HTML content of the website, various subsets of the extracted relevant information are then processed by separate classifier engines by type of data. A metadata classifier engine 204 processes the title of the website and any extracted metadata as input and predicts one or more categories for the website. A sensitive classifier engine 214 processes the remaining types of HTML content data, as listed above, and is responsible for predicting sensitive content categories; i.e., adult content, alcohol, weapons, and so on. Similarly, a non-sensitive classifier engine 224 processes the remaining types of HTML content data and is responsible for predicting non-sensitive content categories; i.e., business, technology, or lifestyle. In one implementation, non-sensitive classifier engine 224 contains two machine-learning models to better handle class imbalance so that one model predicts the larger categories containing more training examples (e.g., technology) and the other model predicts smaller categories with fewer training examples (e.g., survey solutions). A heuristics engine 234 assigns a category to a website based on various heuristics related to its content. For example, in one implementation, heuristics engine 234 may categorize webpages with a shopping cart into the shopping category. Additionally, a signature engine 244 compares the website content with "signatures" of known content for certain categories, such as "no content" or "parked domain" based on string matching of predefined keyword lists.

Following classification by each respective engine 204, 214, 224, 234, 244, and 254, a post-processing engine 225 combines all classification outputs (as well as manual review 215 results by web analysts in certain implementations). A set of post-processing rules, which are described in further depth with reference to FIGS. 8A and 8B, are used to generate a final result of combinations. For example, one implementation may include a post-processing rule dictating that sensitive categories overwrite non-sensitive categories, with or without certain exceptions that allow specific categories to co-exist. In implementations involving manual review 215, the manual review decisions will overwrite categories predicted by the model components.

The final results of URLC mapping produced by post-processing engine 225; i.e., websites and their corresponding categories, are stored in the offline URLC database 172. A subset of the entries from offline URLC database 172 may be loaded into inline URLC database 174.

The input data extracted from a candidate webpage will now be described in further detail.

Webpage Data

FIG. 3 illustrates examples of the types of data 300 that can be extracted for a particular website. Data 300 may include various titles and types of metadata (e.g., those viewable in results 302 from a search engine), source code 362, or content from webpages 304, 364. A publicly accessible web domain may, for example, be accessible via search engine results 302. The domain may be accessible via a parent webpage hyperlink 312 directing towards the parent webpage (i.e., a home page or landing page; or, in other implementations, a child webpage related towards the search engine query) labeled with the title 322 of the domain. A description may be available from metadata 332.

Within data 300, URL "https://www.reallycoolwebsite.com" (i.e., hyperlink 312) directs towards the home page of a website, Really Cool Website. According to the metadata, Really Cool Website is "An imaginary website that doesn't exist." Really Cool Website has a homepage accessible from hyperlink 312, and a hierarchy of progeny webpages that are created in relation to the homepage such as the child webpage Really Cool Website-FAQ accessible by some URL functioning as a child webpage hyperlink 342. The child webpage may have the same metadata as metadata 332 corresponding to the domain, or separate page-specific metadata such as metadata 352 ("Even though it's imaginary, Really Cool Website is helpful in illustrating data."). The title and metadata for a particular webpage can be used in the classification of that webpage.

Each respective webpage has source code 362 defining the webpage data. In example source code 362, HTML data is shown; however, this is not to be considered limiting, and other forms of website code may be included such as CSS. The HTML code in source code 362 contains a header (further containing a title, "Really Cool Website") and a body ("Really Cool Website would have really cool content if it were real. But it isn't."). The source code may also be used in the classification of a webpage; e.g., types of elements within the webpage. Next, the user interface of both the parent webpage 304 (i.e., homepage) and a child webpage 364 (i.e., FAQ page) are described to highlight further webpage content that can be processed as part of extracted webpage data 300.

First, the description will focus on the content elements of parent webpage 304. Parent webpage contains text content, such as the title 316 (Really Cool Website) and text block 326 ("If Really Cool Website existed, it would have some text content. That text content would probably be pretty cool."). Additional URLs may be included as well, such as hyperlinks 324 navigating towards other webpages. The hyperlinks 324 shown on parent webpage 304 direct towards child webpages within the Really Cool Website domain but may also be external URLs as well. Similarly, parent webpage 344 also includes embedded social media icons 344 directing the user towards social media accounts for Really Cool Website. An image is displayed on parent webpage 304 displaying content that might be found on a Really Cool Website, such as a party with dogs. The image description 346 ("This is a really cool embedded image.") can be extracted more easily than recognition of content within the image itself. Certain CSS class elements with defined variables influencing the appearance of content within that class may exist, such as class 328 wherein the elements of class 328 share a similar font style and size. Embedded social media icons 344, for example, may also be a CSS class.

Domain Really Cool Website can contain any number of child webpages in addition to parent webpage 304. For example, child webpage 364 is a related page to parent webpage 304 that contains frequently asked questions, as indicated by title 366 ("Really Cool Website Frequently Asked Questions"). Child webpage 364 has text content 386 that can be extracted as webpage data 300 (e.g., . . . , "Q: Does Really Cool Website exist? A: Not really. Any similarities to real webpages are purely coincidental. Q: Do all websites contain the same content as Really Cool Website? A: No. Really Cool Website is just one example in accordance with one implementation. Q: How would I get to Really Cool Website if it was real? A: With a URL.") as well as URL hyperlinks 324, embedded social media icons 344, and CSS class 368.

In some implementations, each individual webpage identified by its own unique URL is considered as its own data observation for categorization (i.e., parent webpage 304 and child webpage 364 are categorized separately by a URL classifier). However, in other implementations, all webpages may be aggregated into a single domain (i.e., parent webpage 304 and child webpage 364 are both considered the same domain, Really Cool Website, for categorization by a URL classifier) to address the big data problem associated with the volume of public domains available on the Internet. For each data observation (e.g., a webpage domain), the extracted data 300 may include some combination of at least one of a title, metadata, embedded content, text content, CSS class, and/or source code element. A user skilled in the art will recognize that these are purely examples of webpage data and a number of other data formats exist that may be extracted from a webpage that do not divert from spirit or scope of the technology disclosed.

Next, the discussion turns to the processing of webpage data for the purpose of URL classification into one or more webpage categories.

URL Classifier

Figure 4:
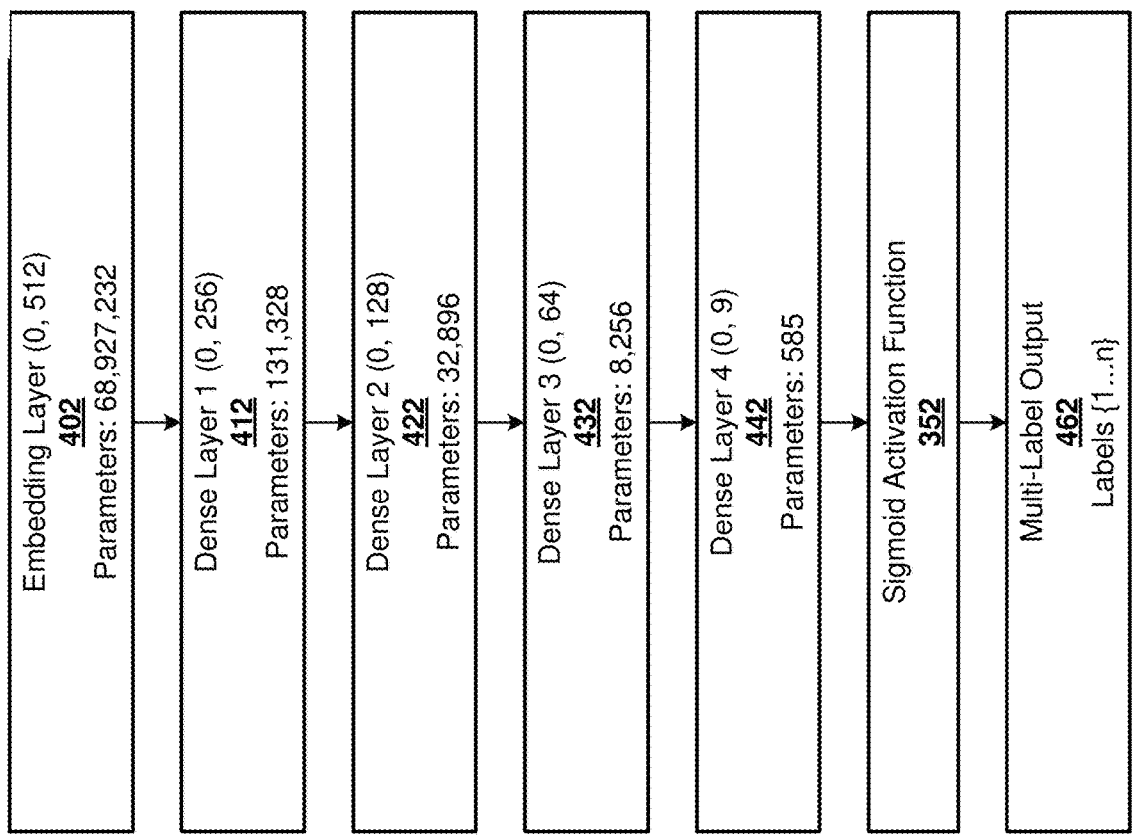
FIG. 4 shows a block diagram for an example deep learning architecture for a classifier within the disclosed ensemble model, in accordance with one implementation of the technology disclosed.

FIG. 4 shows a block diagram for an example deep learning architecture 400 for a URL classifier within the disclosed ensemble model, in accordance with one implementation of the technology disclosed. In the example architecture 400, the input data (e.g., obtained from webpage data 300 for the web domain) is processed by an embedding layer 402, a first dense layer 412, a second dense layer 422, a third dense layer 432, a fourth dense layer 442, a sigmoidal activation function 352, each with their own respective dimension and parameter values, followed by a multi-label output layer 462 with n output labels.

In other implementations of the technology disclosed, the deep learning architecture may also contain concatenating layers, dropout layers, softmax, or alternative activation functions as well as differing dimensionality and hyperparameters. A user skilled in the art will recognize that the example architecture is purely given for illustrative purposes and should not be considered limiting. In many implementations, the various nonoverlapping classifiers within the disclosed classifier ensemble (i.e., metadata classifier engine 204, sensitive classifier engine 214, and non-sensitive classifier engine 224) may have nonoverlapping architectural components or parameters, while in other implementations, at least one architectural component of two or more classifiers within the disclosed classifier ensemble may share the same architecture and/or parameters.

The process of training a URL classifier, such as URL classifier architecture 400, will now be expanded upon.

Figure 5:
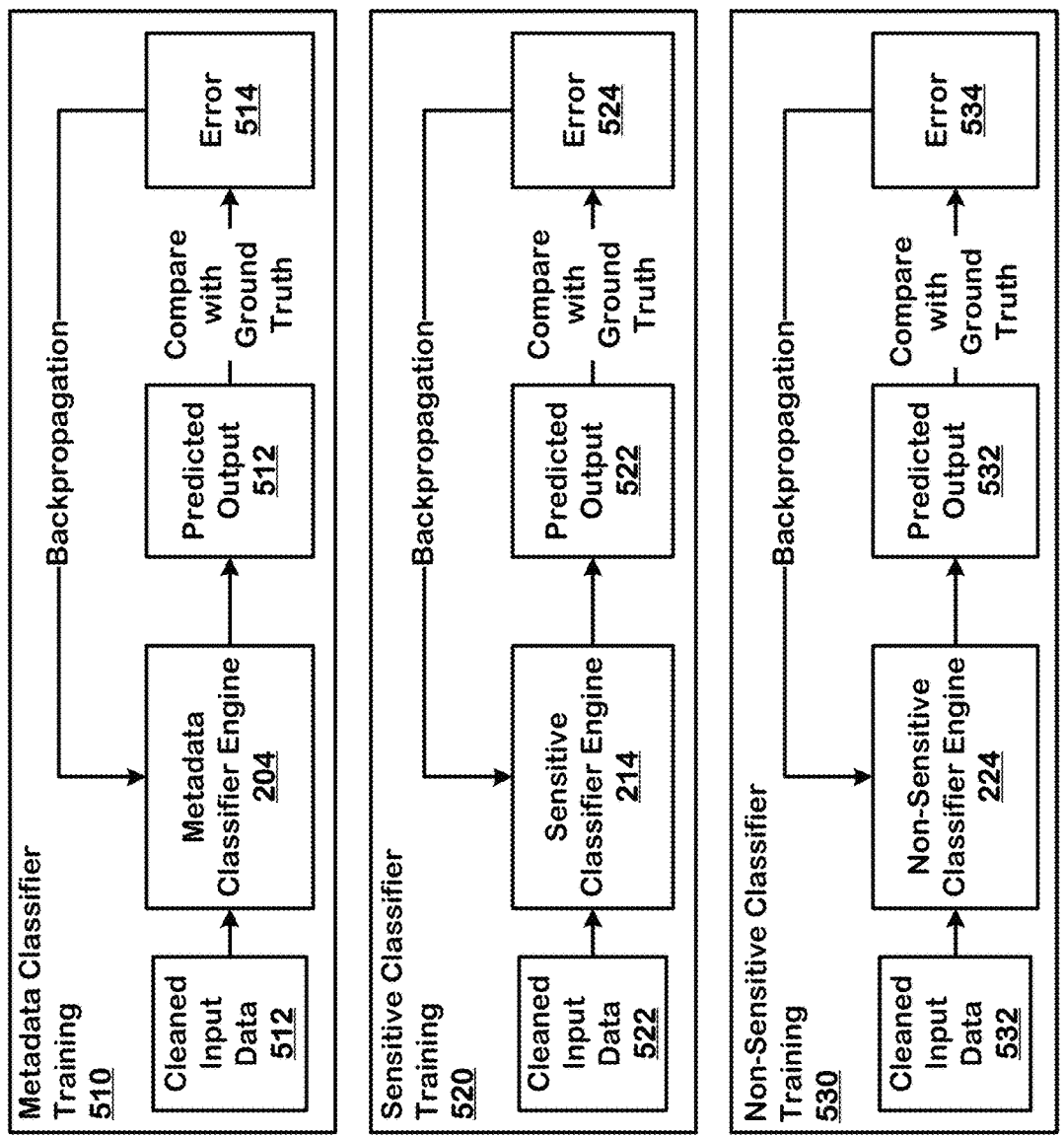
FIG. 5 shows examples of training processes for URL content classifiers.

FIG. 5 shows examples of training processes 500 for URL content classifiers. Within the process illustrated by FIG. 5, the three classifiers—metadata classifier engine 204, sensitive classifier engine 214, and non-sensitive classifier engine 224—are all trained independently of one another. The training process 510 will be described in detail for metadata classifier engine 204 and is similar for the two other processes 520 and 530, corresponding to sensitive classifier engine 214 and non-sensitive classifier engine 224, respectively.

In training process 510, input data 512, that of which has previously been cleaned to eliminate noise from the data, is processed by a metadata classifier engine 204. The cleaning and noise elimination process is described in further detail with reference to FIG. 6. Cleaned input data 512 has ground truth labels that can be used to evaluate the accuracy of the predicted output classes 512 for each domain within input 512 to obtain a training error value 514. The training error is backpropagated through metadata classifier engine 204 to iteratively train the metadata classifier engine 204 until the error function converges, a certain number of training epochs has been completed, or a pre-determined threshold error value has been reached.

Accordingly, both sensitive classifier engine 214 and non-sensitive classifier engine 224 may be trained in a similar procedure. In the training 520 of sensitive classifier engine 214, cleaned input data 522 (which may be overlapping or nonoverlapping in ground truth observations from cleaned input data 512) is used to train sensitive classifier engine 214, during which predicted output classification 522 is compared with the ground truth labels to obtain an error value 524. In the training 530 of non-sensitive classifier engine 224, cleaned input data 532 (which may be overlapping or nonoverlapping in ground truth observations from cleaned input data 512 and/or cleaned input data 522) is used to train non-sensitive classifier engine 224, during which predicted output classification 532 is compared with the ground truth labels to obtain an error value 534.

The training process disclosed herein, in many implementations, further includes a noise elimination process in order to reduce the number of mislabeled and/or noisy observations used in training. As discussed above, a challenge associated with the categorization of domain URLs is the risk of noisy data as introduced by conflicting, limited, or confounding data extracted from a particular domain due to the dynamic and/or variable nature of webpages. The implementation noise elimination process 600 illustrated within FIG. 6 provides a solution to this challenge.

Figure 6:
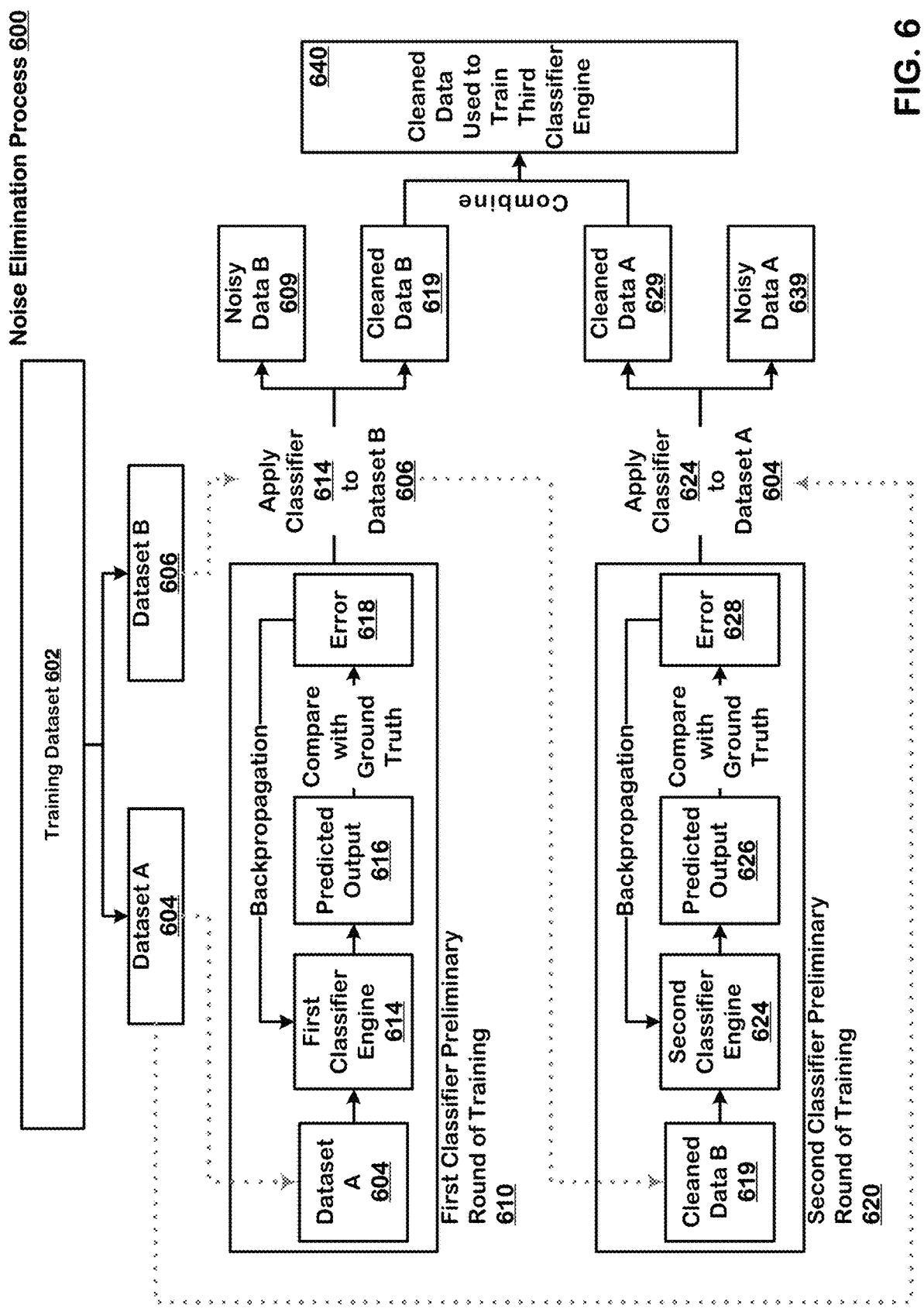
FIG. 6 shows a block diagram for an example noise elimination workflow.

FIG. 6 shows a block diagram for an example noise elimination workflow 600. A large quantity of web domains with corresponding extracted webpage data forms a database of training input data 602. A dataset A 604 and a dataset B 606 are extracted from the input dataset 602, each containing a nonoverlapping subset of webpage data (i.e., no webpages within dataset A 604 are found within dataset B 602 and vice versa). In one implementation, dataset A 604 and dataset B 606 are equal halves of the training data 602 (i.e., training dataset 602 contains n observations and each of the dataset A 604 and dataset B 606 contain n 2 observations, respectively). In another implementation, dataset A 604 and dataset B 606 contain a smaller number of observations such that some number of observations within training dataset 602 are not used within either dataset A 604 or dataset B 606 (i.e., training dataset 602 contains n observations, dataset A 604 contains i observations, dataset B 606 contains j observations, and k observations are not found in either dataset A 604 or dataset B 606 such that (i+j+k=n), wherein i, j, and k may be equivalent or nonequivalent quantities to one another).

Selection of webpages from training dataset 602 to be extracted for either dataset A 604 or dataset B 606 may be random, or selection may be based on criteria based on a particular goal. In one example implementation, sensitive category webpages are selected for dataset A 604 and non-sensitive webpages are selected for dataset B 606. In another example implementation, general category webpages are selected for dataset A 604 and specific category webpages are selected for dataset B 606. In yet another implementation, the division of webpages within training dataset 602 is performed in other to maintain class balance (thereby mitigating training error resulting from class imbalance) such that webpages belonging to categories with a similar number of observations are grouped into the same dataset.

A user skilled in the art will recognize the variety of ways that groupings based on class size can be done such as binning into quantiles (e.g., webpages belonging to categories at or below the $25^{th}$ quartile by observation quantity are extracted into one dataset while webpages belonging to categories at or above the $75^{th}$ quantile by observation quantity are extracted into another dataset), enumerating into a ranked list and splitting the list based on a pre-determined threshold (e.g., after sorting the webpage categories by class size, webpages that are classified within webpage categories containing the top 50% of observation quantities are extracted into one dataset and the bottom 50% into the other dataset), allowing a certain degree of variance between categories (e.g., all webpages within a dataset belong to categories containing a number of observations that is no more than 10% away from the mean number of observations within all categories included in the dataset), and so on. For the above-described example implementations, similar operations may be performed in dependence on any particular feature(s) associated with the training dataset 602.

In the implementation shown within workflow 600, the noise elimination process involves splitting input data 602 in half. However, in other implementations, the noise elimination process may involve selection of varying subsets of input data 602 based on size, categories of ground truth data, and so on, as well as including differing proportions of input data 602 wherein some observations within input data 602 may not be used within either preliminary training process 610 or 620.

Dataset A 604 is used as input training data to train a first classifier engine 614 in a first preliminary training process 610. In preliminary training process 610 for the first classifier engine 614, the predicted output 616 is compared with the ground truth labeling to obtain an error metric 618 and iteratively train the first classifier engine 614 via backpropagation. The error metric 618 may, for example, be a decision confidence metric to be compared to a pre-determined threshold value of confidence for the label of a particular web domain within dataset A 604 (i.e., the likelihood of mislabeling for the web domain). The decision confidence metric is evaluated based on, at least, a classification score output from the first classifier engine 614. Herein, the reference to an error metric, decision confidence metric, or confidence scores associated with a particular model refers to a metric determined from, at least, the classification output of said particular model. Following preliminary training process 610, the trained first classifier engine can be tested using the dataset B 606 (containing the remaining half of input data 602, nonoverlapping with dataset A 604) to determine which domains are likely to be mislabeled. In one implementation, this may be a pre-determined decision threshold for label confidence that separates domains below the threshold as being noisy data 609 that is likely to be mislabeled, or domains above the threshold as being unlikely to be mislabeled data, which will be separated from data 609. In other implementations, the decision confidence metric may be based on a confusion matrix output, a precision or recall value, an entropy metric, a confidence interval, an F-score, or other similar evaluation metric.

The result following the pruning of noisy data B 609 is a cleaned dataset B 619. In certain implementations, the process may involve a cleaning package such as CleanLab. In some implementations, the process may further include correcting certain labels within mislabeled data and including the domain with the corrected label within data 619.

In preliminary training process 620, the cleaned dataset B 619, resulting from process 610, is used to train a second classifier engine 624, during which the predicted output 626 is compared with the ground truth labeling to obtain an error metric 628 and iteratively train the second classifier engine 624 via backpropagation. Following preliminary training process 620, the trained first classifier engine can be tested using dataset A 604 to determine which domains are likely to be mislabeled, using the same process as described above with regard to process 610. The data can again be pruned via removing noisy data A 639, leveraging a decision confidence metric and/or cleaning packages, resulting in a cleaned dataset A 629.

At this stage, both dataset A 604 and dataset B 606 have been cleaned. The noise elimination process 600 is based on the principle that if a classifier engine (614 or 624) is properly trained with an acceptable training error but cannot accurately predict the class(es) of an unseen webpage from another dataset, it is likely that the webpage was mislabeled and cannot reliably be used for training processes. The cleaned datasets 619 and 629 resulting from the noise elimination procedure 600 can then be combined into a single cleaned dataset 640, and clean data 640 may then be used to train a third classifier engine.

In some implementations of the technology disclosed, the first classifier engine 614, second classifier engine 624, and third classifier engine to be trained preliminarily with data 640 may each be one of either the metadata classifier engine 204, sensitive classifier engine 214, and/or non-sensitive classifier engine 224. In one implementation, the respective classifier engines may have differing thresholds for likelihood of mislabeling (e.g., the sensitive classifier engine 214 may be given a more stringent threshold than the non-sensitive classifier engine 224 to put more emphasis on the importance of correctly classifying sensitive categories). In certain implementations, the noise elimination process 600 happens iteratively such that the cleaning process occurs repeatedly to prune the dataset until a sufficient condition to terminate the process is reached such as a quantity of remaining domains, a percentage reduction in dataset size, or a pre-determined target error value is obtained.

In one particular implementation, each iteration within a sequence of iterative noise elimination involves a different ordering of classifiers positionally within the workflow. For example, in a preceding iteration, the first round of preliminary training 610 is applied to the metadata classifier engine 204, the second round of preliminary training 620 is applied to the sensitive classifier engine 214, and the cleaned data 640 from the preceding iteration is used for preliminary training of the non-sensitive classifier engine 224. In a current iteration following the preceding iteration, the first round of preliminary training 610 is now applied to the sensitive classifier engine 214 using a subset of cleaned data from the preceding iteration, the second round of preliminary training 620 is now applied to the non-sensitive classifier engine 224 using a subset of cleaned data from the preceding iteration, and the resulting cleaned data 640 from the current iteration is used for preliminary training of the metadata classifier engine 204. In another implementation, the classifier engine corresponding to each training process does not change position (i.e., the first classifier engine 614 for the first round 610 and second classifier engine 624 for the second round 620) until a certain pre-determined error metric is obtained. In some implementations, the subsets of input data 602 are selected based on category size to prevent class imbalance.

FIG. 7 is a table 700 with example training data volume across different website categories. In table 700, the training data (in accordance with one implementation of the technology disclosed) is divided into the following sensitive categories: adult content, gambling, dating, marijuana, weapons, abortion, alcohol, tobacco, web proxies/anonymizers, parked domains, pay to surf, piracy and copyright theft, chat/IM/other communication, cloud storage, peer-to-peer (P2P), and criminal activities; as well as the following non-sensitive categories: automotive, education, entertainment, fashion, finance/accounting, games, government/legal, health/nutrition, home/garden, job search/careers, real estate, religion, social, sports, technology, and trading/investing.

Following the training of the various classifiers within ensemble 200, the ensemble can be used to classify web domains into one or more categories. Often, a particular domain will belong to multiple categories. Certain categories may be allowed to co-exist while others are not, either due to rules based on prioritization or accuracy. For example, it may be more important, as defined by a set of post-processing rules, for a domain to be classified by its sensitive categories than its non-sensitive categories to ensure proper application of security policies. In another example, the post-processing rules may keep a more specific category over a more general category (e.g., trading/investing over finance/accounting) to better apply more specific security policies to these categories that may not apply to other webpages within the more general category. These post-processing rules, enforced during operations of the post-processing engine 225, will now be described with reference to FIGS. 8A and 8B.

FIG. 8A shows example pseudocode 800A for operations performed by a post-processing engine 225. Pseudocode 800A addresses rules relating to example cases for unreachable domains and sensitive-categorized domains. In the first example case, a post-processing rule determines that the unreachable category overwrites everything; i.e., if a domain is labelled as unreachable, all other labels are overwritten. In the second example case, a post-processing rule determines that, if a domain is assigned to both a sensitive and a non-sensitive category, and the non-sensitive category label is a general category (e.g., blogs, shopping, technology, or social), both the sensitive and non-sensitive labels are kept. However, if the domain is assigned to both a sensitive and a non-sensitive category where the non-sensitive category label is specific (i.e., not general), the non-sensitive category label is overwritten by the sensitive category label. In the third example case, post-processing rules determine when the sensitive categories for marijuana, weapons, and/or alcohol should be removed as false positives due to a co-occurring non-sensitive label. For example, if a domain is labeled as belonging to both the marijuana and legal categories, the marijuana label is overwritten. If a domain is labeled as belonging to both the weapons and the trade association categories, the weapons category is overwritten. If a domain is labeled as belonging to both the alcohol and the food/drink categories, the alcohol category is overwritten. Further example cases are given below with reference to pseudocode 800B.

FIG. 8B continues with example pseudocode 800B for operations performed by a post-processing engine 225. The pseudocode 800B includes post-processing rules for general and specific non-specific categories. Within the rules included within pseudocode 800B, a more general category is overwritten if a more specific category exists. In one example, business is removed as a category if shopping is also included as a category for a webpage. In another example, technology is removed as a category if webmail is also included as a category for a webpage. In one implementation of the technology disclosed, categories either belong to a general class or a specific class in a flat taxonomy. In other implementations, categories belong to a taxonomy tree with umbrellas of nested categories.

In addition to post-processing engine 225, post-processing may also be performed manually by a web analyst in certain implementations.

Objective Indicia of Non-Obviousness

FIG. 9 is a table 900 containing accuracy scores obtained from one implementation of the disclosed URL categorization classifier for a number of website categories. The table includes both sensitive (e.g., adult content, weapons, or tobacco) and non-sensitive categories (e.g., sports, automotive, or translation).

Figure 10B:
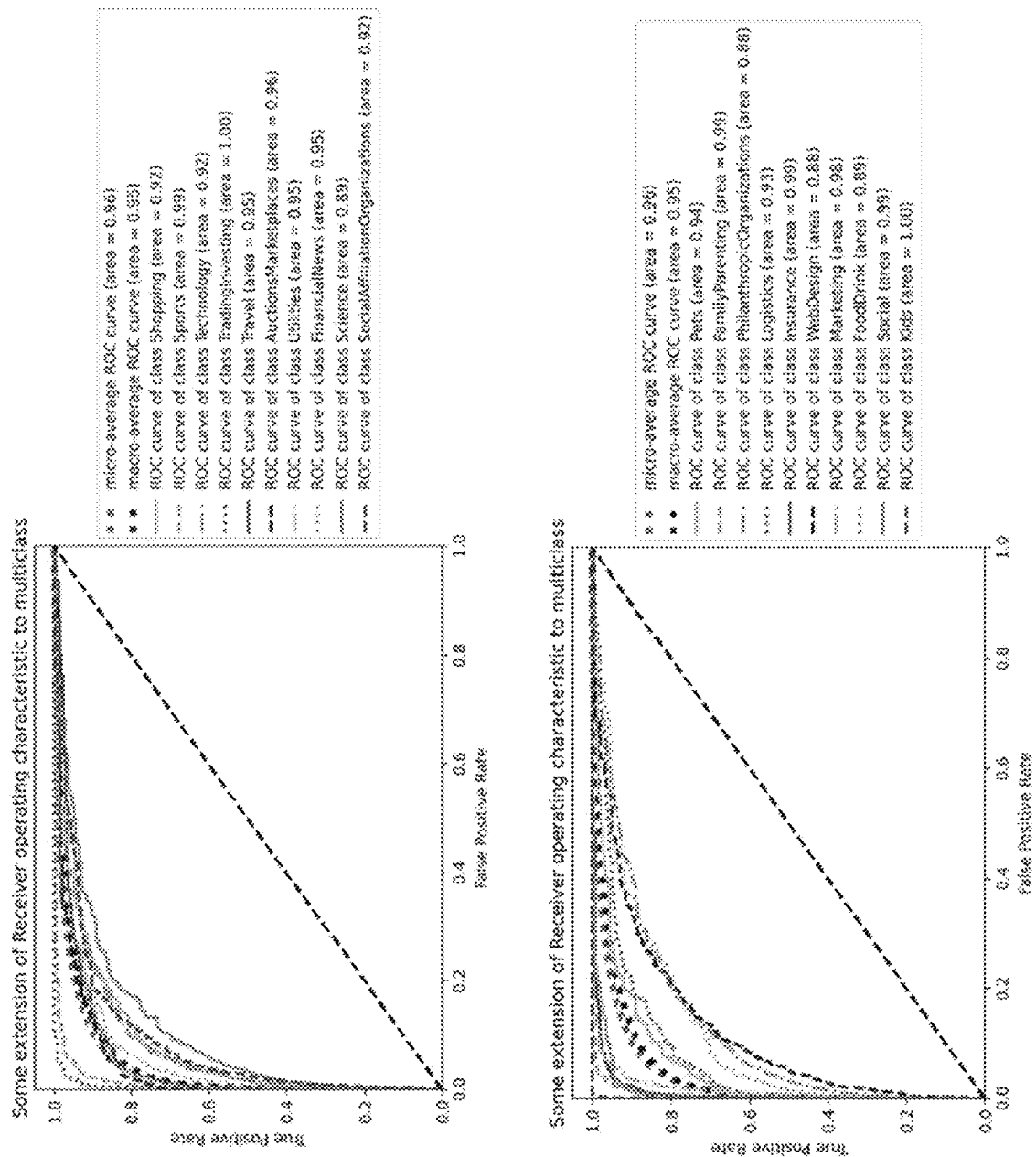
FIG. 10B shows two additional receiver operating characteristic graphs obtained from one implementation of the disclosed URL categorization classifier for a number of website categories.

FIG. 10A shows two receiver operating characteristic (ROC) graphs obtained from one implementation of the disclosed URL categorization classifier for a number of website categories. FIG. 10B shows two additional ROC graphs obtained from one implementation of the disclosed URL categorization classifier for a number of website categories. The example results shown in FIGS. 10A and 10B are from the same implementation; however, given the volume of webpage categories possible, the results have been split into four separate graphs in order to improve readability of the data. In the top graph of FIG. 10A, curves are shown (along with area under the curve (AUC) values) for categories including advocacy groups/trade associations, automotive, business, education, entertainment, fashion, finance/accounting, games, government/legal, and health/nutrition. The bottom graph in FIG. 10A also shows ROC/AUC data for the hobbies/interests, home/garden, ISP/Telco, job search/careers, lifestyle, news/media, personal sites/blogs, real estate, religion, and security categories. The top graph in FIG. 10B shows ROC/AUC data for the shopping, sports, technology, trading/investing, travel, auctions/marketplaces, utilities, financial news, science, and social affiliation/organizations. The bottom graph in FIG. 10B shows ROC/AUC data for the pets, family/parenting, philanthropic organizations, logistics, insurance, web design, marketing, food/drink, social, and kids categories.

Computer System

Figure 11:
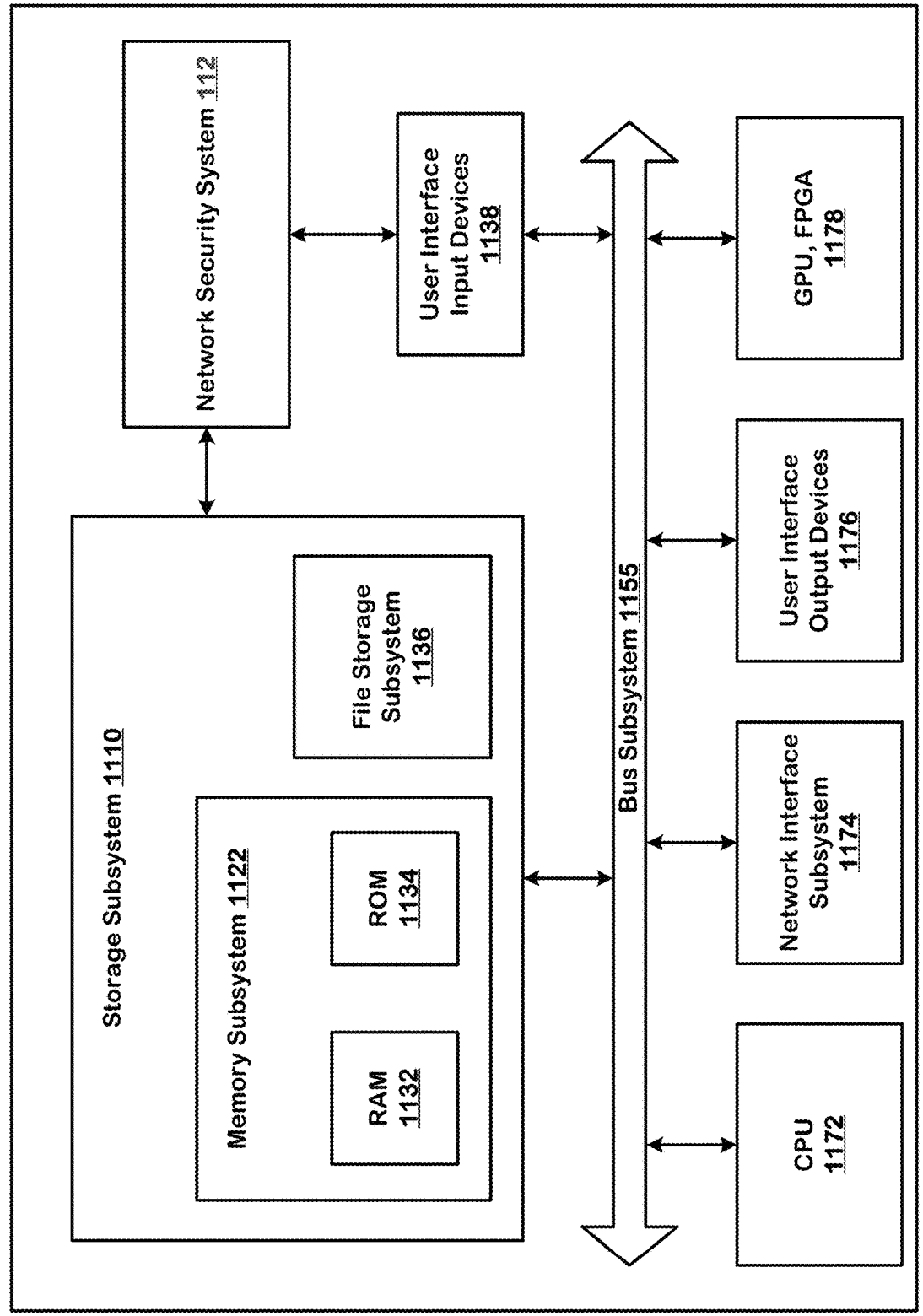
FIG. 11 is a simplified block diagram of a computer system that can be used to implement the disclosed URL categorization classifier, in accordance with one implementation of the technology disclosed.

FIG. 11 is a simplified block diagram of a computer system 1100 that can be used to implement the disclosed URL categorization classifier, in accordance with one implementation of the technology disclosed. Computer system 1100 is also usable to implement dynamic distribution of unified security policies in a cloud-based security system, dynamically route access request streams in a unified security system, and detect security issues in a cloud-based environment. Computer system 1100 includes at least one central processing unit (CPU) 1172 that communicates with a number of peripheral devices via bus subsystem 1155, and network security system 112 for providing network security services described herein. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one embodiment, network security system 112 of FIG. 1 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. Subsystem 1178 can be graphics processing units (GPUs) or field-programmable gate arrays (FPGAs).

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

Next we describe some specific implementations of the disclosed technology for training a third classifier running on processors to label webpages with webpage categories, for training a third classifier ensemble running on processors to select between sensitive or non-sensitive categories for a webpage that includes both sensitive and non-sensitive contents, and for choosing between alternative category labels tentatively assigned to webpages by a classifier ensemble.

Particular Implementations

Some particular implementations and features for training a third classifier running on processors to label webpages with webpage categories, for training a third classifier ensemble running on processors to select between sensitive or non-sensitive categories for a webpage that includes both sensitive and non-sensitive contents, and for choosing between alternative category labels tentatively assigned to webpages by a classifier ensemble are described next.

One implementation of the disclosed technology includes an improved computer-implemented method of training a third classifier running on processors to label webpages with webpage categories, extracting, from a training database including hundreds of thousands of webpages tentatively labeled with ground truth categories, a dataset A and a dataset B. The disclosed method also includes training a first classifier using the dataset A, applying the first classifier to the webpages in the dataset B to assign a webpage a label and a classification score, and cleaning the dataset B to obtain a cleaned dataset B The cleaning includes removing at least one webpage from the dataset B based on an evaluation of, at least, a decision confidence metric assigned to the webpage, wherein the decision confidence metric is derived from, at least, the classification score assigned to the webpage. The method further includes training a second classifier using the cleaned dataset B, wherein second classifier weights are initialized independent of trained first classifier weights, and applying the second classifier to the webpages in the dataset A to assign a webpage the label, the classification score, and a decision confidence matrix. Also included in the disclosed method is cleaning the dataset A to obtain a cleaned dataset A, wherein the cleaning includes removing at least one webpage from the dataset A based on an evaluation of, at least, the decision confidence metric assigned to the webpage, combining the cleaned dataset A and the cleaned dataset B into a combined clean dataset, and training the third classifier using the combined clean dataset.

The device described in this section and other sections of the technology disclosed can include one or more of the following features and/or features described in connection with additional features disclosed. In the interest of conciseness, the combinations of features disclosed in this application are not individually enumerated and are not repeated with each base set of features. The reader will understand how features identified in this method can readily be combined with sets of base features identified as implementations.

For many implementations of the disclosed technology, the training database includes at least millions of webpages and the extracting populates the data sets A and B each with millions of tentatively labelled webpages.

Many implementations of the disclosed method further include the first, second and third classifiers including a pretrained encoder that is not subject to further training and dense layers following the pretrained encoder that are trained.

Some implementations of the disclosed method include the first, second and third classifiers assigning the labels from categories of sensitive webpages, and the combined clean dataset containing fewer mislabeled sensitive webpages than tentatively labeled datasets A and B before cleaning.

Most implementations of the disclosed method further include the first, second and third classifiers assigning the labels from categories of non-sensitive webpages, and the combined clean dataset containing fewer mislabeled non-sensitive webpages than the tentatively labeled datasets A and B before cleaning.

For many implementations of the disclosed method, the first, second and third classifiers are classifier ensembles that include at least two classifiers assigning the labels from categories of sensitive and non-sensitive webpages, respectively, and the combined clean dataset containing fewer mislabeled sensitive and non-sensitive webpages than the tentatively labeled datasets A and B before cleaning.

Many implementations of the disclosed method include applying the first, second and third classifiers to content of the webpages.

Some implementations of the disclosed method include applying the first, second and third classifiers to a title field and a metadata field of the webpages for categories of non-sensitive webpages.

For some implementations of the disclosed method, second coefficients of the second classifier are trained independently of first coefficients of the first classifier.

Many implementations of the disclosed method further include cleaning the datasets A and B using criteria that vary by category label responsive to estimated accuracy of assigning respective category labels.

For some implementations of the disclosed method, the first, second and third classifiers are classifier ensembles that include at least sensitive and non-sensitive classifiers assigning the labels from categories of sensitive and non-sensitive webpages, respectively, based on content of the webpages, a title-meta classifier assigning the labels from categories of non-sensitive webpages based on a title field and a metadata field of the webpages, and a post-processor that combines outputs of the sensitive, non-sensitive and title-meta classifiers and assigns at least one accuracy metric to labels assigned during post-processing, wherein the combined clean dataset containing fewer mislabeled sensitive and non-sensitive webpages than the tentatively labeled datasets A and B before cleaning.

For many implementations of the disclosed method, the classifier ensemble includes a title-metadata machine learning engine that operates on title and meta information of a domain home webpage.

For some implementations of the disclosed technology, the classifier ensemble includes a heuristics engine that detects at least presence of a shopping cart on or linked to a webpage.

For many implementations of the disclosed method, the classifier ensemble includes a signature engine that compares content of a webpage with signatures of known content for certain categories, such as "no content" and "parked domain", based on string matching of one or more predefined keyword lists.

For some implementations, the cleaning further includes applying at least one predetermined threshold to the decision confidence scores. In some cases, the cleaning further includes applying a plurality of category-by-category predetermined thresholds. For some implementations of the disclosed method, the cleaning further includes applying a data cleaning utility.

Another implementation of the disclosed technology includes a computer-implemented method of training a third classifier ensemble running on processors to select between sensitive or non-sensitive categories for a webpage that includes both sensitive and non-sensitive content. The disclosed method includes extracting, from a training database including hundreds of thousands of webpages tentatively labeled with ground truth categories, a dataset A and a dataset B. The method also includes training a first classifier ensemble that includes at least a first sensitive category classifier and a first non-sensitive category classifier using the dataset A to select among sensitive category labels, and to select among non-sensitive category labels. And applying the first classifier ensemble to the webpages in the dataset B to assign one or more labels to a webpage and producing at least some first dual labelled webpages that are assigned both a sensitive category label and a non-sensitive category label, including confidence scores for both of the category labels. The method further includes automatically referring at least some of the dual labelled webpages, including the category labels and the confidence scores, via a graphic user interface (GUI) to a human curator to curate and resolve label conflict by removing either the sensitive category label or the non-sensitive category label, receiving curated labels from the human curator, and updating dataset B with the curated labels. Also included is training a second classifier ensemble using the updated dataset B, applying the second classifier ensemble to the webpages in the dataset A to assign one or more labels to a webpage the label and producing at least some second dual labelled webpages that are assigned both a sensitive category label and a non-sensitive category label, including confidence scores for both of the category labels. Yet further the disclosed method includes automatically referring at least some of the dual labelled webpages, including the category labels and the confidence scores, via a graphic user interface to a human curator to curate and resolve label conflict by removing either the sensitive category label or the non-sensitive category label, receiving curated labels from the human curator, and updating dataset A with the curated labels, combining the curated dataset A and the updated dataset B into a combined clean dataset, and training the third classifier ensemble using the combined clean dataset.

For many implementations of the disclosed technology, training stages are repeated until the confidence scores from an additional sensitive category classifier and an additional non-sensitive category classifier for labels applied to webpages including both sensitive and non-sensitive content achieve predetermined confidence thresholds.

Some implementations of the disclosed method further include human review of pairs of sensitive and non-sensitive category labels assigned to the dual labelled webpages to select label pairings among the dual labelled webpages for the automatically referring to the human curator. For some cases, the sensitive category label in a selected label pairing is gambling-related, and confidently trained coefficients cause the classifier ensemble to assign a hotel casino webpage a travel-related category label and to not assign a gambling-related category label that would be used to block access to the hotel casino webpage. For other cases, the sensitive category label in a selected label pairing is weapon-related. For some cases, the sensitive category label in a selected label pairing is drug-related.

Many implementations of the disclosed method further include applying confidently trained coefficients and the classifier ensemble to webpages, saving resulting labels, and distributing resulting confidently trained labels for use in controlling access to domains by users on user systems protected using the resulting confidently trained labels. In some cases, the systems are protected by a module running directly on the user systems.

For some implementations of the disclosed method, the user systems are protected by a cloud-based proxy through which requests from the user systems are routed before reaching the webpages.

A further implementation of the disclosed technology includes a computer-implemented method of choosing between alternative category labels tentatively assigned to webpages by a classifier ensemble running on processors, applying the classifier ensemble including at least a sensitive category classifier, a non-sensitive category classifier, a title and metadata classifier and a heuristic classifier to at least tens of thousands of webpages. The disclosed method also includes applying a post processor to outputs of the classifier ensemble and, for at least some of the webpages, tentatively assigning at least two category labels for non-sensitive categories, and for at least some of the webpages assigned the at least two category labels, automatically determining that at least one but not all of the tentatively assigned category labels is a general label and de-assigning the general label, saving the category label that is not de-selected to the webpage, and distributing the assigned category labels for at least some of the tens of thousands of webpages for use in controlling access to webpages by users on user systems protected using the assigned labels.

For many implementations of the disclosed technology, the classifier ensemble includes a heuristics engine that detects at least presence of a shopping cart on or linked to a webpage, further including applying a shopping category label to the webpage as one of the at least two category labels, determining that the shopping category label is the general label, and de-selecting the shopping category label. For some implementations, the two category labels are not arranged in a tree from general to specific, further including the automatically determining from a list of general category labels that the at least one tentatively assigned category label appears on the list and de-selecting the tentatively assigned category label that appears on the list.

For some implementations of the disclosed method, the automatically determining further includes accessing a list of scored category labels, finding that a first score of at least one tentatively produced category label differs from at least one other tentatively produced category label in excess of a predetermined threshold that indicates relative generality and deselecting the category label having the first score.

For some implementations of the disclosed technology, the webpages are domain home pages.

For many implementations of the disclosed technology, the user systems are protected by a module running directly on the user systems. For some implementations, the user systems are protected by a cloud-based proxy through which requests from the user systems are routed before reaching the webpages.

For some implementations of the disclosed technology, the distributed labels are blacklist labels. For other implementations, the distributed labels are whitelist labels.

Other implementations of the disclosed technology described in this section can include a tangible non-transitory computer readable storage medium, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of choosing between alternative category labels tentatively assigned to webpages by a classifier ensemble running on processors, including:
    applying the classifier ensemble including at least a sensitive category classifier, a non-sensitive category classifier, a title and metadata classifier and a heuristic classifier to at least tens of thousands of webpages;
    applying a post processor to outputs of the classifier ensemble and, for at least some of the webpages, tentatively assigning at least two category labels for non-sensitive categories to produce tentatively assigned category labels;
    for at least some of the webpages assigned the at least two category labels, automatically determining that at least one but not all of the tentatively assigned category labels is a general label and de-selecting the general label;
    saving the assigned category label that is not de-selected to the webpage; and
    distributing the assigned category labels for at least some of the tens of thousands of webpages for use in controlling access to webpages by users on user systems protected using the assigned category labels.

2. The computer-implemented method of claim 1, wherein the classifier ensemble includes a heuristics engine that detects at least presence of a shopping cart on or linked to a webpage, further including:
    applying a shopping category label to the webpage as one of the at least two category labels;
    determining that the shopping category label is the general label; and
    de-selecting the shopping category label.

3. The computer-implemented method of claim 1, wherein the two category labels are not arranged in a tree from general to specific, further including the automatically determining from a list of general category labels that at least one tentatively assigned category label appears on the list and de-selecting the tentatively assigned category label that appears on the list.

4. The computer-implemented method of claim 1, wherein the automatically determining further includes accessing a list of scored category labels, finding that a first score of at least one tentatively produced category label differs from at least one other tentatively produced category label in excess of a predetermined threshold that indicates relative generality and deselecting the category label having the first score.

5. The computer-implemented method of claim 1, wherein the webpages are domain home pages.

6. The computer-implemented method of claim 1, wherein the user systems are protected by a module running directly on the user systems.

7. The computer-implemented method of claim 1, wherein the user systems are protected by a cloud-based proxy through which requests from the user systems are routed before reaching the webpages.

8. The computer-implemented method of claim 1, wherein the distributed assigned category labels are blacklist labels.

9. The computer-implemented method of claim 1, wherein the distributed assigned category labels are whitelist labels.

10. A tangible non-transitory computer-readable storage medium, including program instructions loaded into memory that, when executed on processors, cause the processors to implement a method of choosing between alternative category labels tentatively assigned to webpages by a classifier ensemble, the method including:
    applying the classifier ensemble including at least a sensitive category classifier, a non-sensitive category classifier, a title and metadata classifier and a heuristic classifier to at least tens of thousands of webpages;
    applying a post processor to outputs of the classifier ensemble and, for at least some of the webpages, tentatively assigning at least two category labels for non-sensitive categories to produce tentatively assigned category labels;
    for at least some of the webpages assigned the at least two category labels, automatically determining that at least one but not all of the tentatively assigned category labels is a general label and selecting the general label;
    saving the assigned category label that is not de-selected to the webpage; and
    distributing the assigned category labels for at least some of the tens of thousands of webpages for use in controlling access to webpages by users on user systems protected using the assigned category labels.

11. The tangible non-transitory computer-readable storage medium of claim 10, wherein the classifier ensemble includes a heuristics engine that detects at least presence of a shopping cart on or linked to a webpage, further including:
    applying a shopping category label to the webpage as one of the at least two category labels;
    determining that the shopping category label is the general label; and
    de-selecting the shopping category label.

12. The tangible non-transitory computer-readable storage medium of claim 10, wherein the two category labels are not arranged in a tree from general to specific, further including the automatically determining from a list of general category labels that at least one tentatively assigned category label appears on the list and de-selecting the tentatively assigned category label that appears on the list.

13. The tangible non-transitory computer-readable storage medium of claim 10, wherein the webpages are domain home pages.

14. The tangible non-transitory computer-readable storage medium of claim 10, wherein the distributed assigned category labels are blacklist labels.

15. The tangible non-transitory computer-readable storage medium of claim 10, wherein the distributed assigned category labels are whitelist labels.

16. A system for training a third classifier ensemble for choosing between alternative category labels tentatively assigned to webpages by a classifier ensemble running on processors, the system including a processor, memory coupled to the processor, and computer instructions from the tangible non-transitory computer readable storage medium of claim 10 loaded into the memory.

17. The system of claim 16, wherein the classifier ensemble includes a heuristics engine that detects at least presence of a shopping cart on or linked to a webpage, further including:
 applying a shopping category label to the webpage as one of the at least two category labels;
 determining that the shopping category label is the general label; and
 de-selecting the shopping category label.

18. The system of claim 16, wherein the two category labels are not arranged in a tree from general to specific, further including the automatically determining from a list of general category labels that at least one tentatively assigned category label appears on the list and de-selecting the tentatively assigned category label that appears on the list.

19. The system of claim 16, wherein the webpages are domain home pages.

20. The system of claim 16, wherein the distributed assigned category labels are one of blacklist labels or whitelist labels.

\* \* \* \* \*